(12) United States Patent
Lamance

(10) Patent No.: US 8,009,098 B2
(45) Date of Patent: Aug. 30, 2011

(54) STACCATO PULSE EDGE CORRELATION

(76) Inventor: James Lamance, Los Angeles, CA (US)

( * ) Notice: Subject to any disclaimer, the term of this patent is extended or adjusted under 35 U.S.C. 154(b) by 598 days.

(21) Appl. No.: 11/547,694

(22) PCT Filed: Apr. 7, 2005

(86) PCT No.: PCT/AU2005/000493
§ 371 (c)(1),
(2), (4) Date: Nov. 19, 2008

(87) PCT Pub. No.: WO2005/098469
PCT Pub. Date: Oct. 20, 2005

(65) Prior Publication Data
US 2010/0188291 A1    Jul. 29, 2010

(30) Foreign Application Priority Data
Apr. 8, 2004    (AU) ................................ 2004901930

(51) Int. Cl.
*G01S 3/16* (2006.01)
(52) U.S. Cl. ......................................................... 342/378
(58) Field of Classification Search .............. 342/357.61, 342/378
See application file for complete search history.

(56) References Cited

U.S. PATENT DOCUMENTS

| 5,687,196 | A | 11/1997 | Proctor, Jr. et al. | |
| 7,356,074 | B2 * | 4/2008 | Shan | 375/150 |
| 2002/0155845 | A1 * | 10/2002 | Martorana | 455/456 |
| 2002/0176511 | A1 | 11/2002 | Fullerton et al. | |
| 2003/0050022 | A1 | 3/2003 | Kuroiwa et al. | |
| 2004/0150552 | A1 * | 8/2004 | Barbella et al. | 342/109 |

FOREIGN PATENT DOCUMENTS

CN    1474196 A    2/2004

* cited by examiner

*Primary Examiner* — Thomas H Tarcza
*Assistant Examiner* — Harry Liu

(57) ABSTRACT

The present invention discloses a system and method for mitigating multipath in DSSS CDMA radio navigation signals by a) transmitting a rapid pulsing pattern from a transmitting device to a position receiver that samples the transmitted signal, b) separating the received samples and storing sample-based correlation accumulation values into independent bins that are synchronous with the received pulsing pattern, c) applying a logical decision process to determine the accumulation bin associated with the leading edges of the received pulses, and d) generating a range estimate from the correlation accumulation bin associated with the leading edges of the received pulses.

20 Claims, 5 Drawing Sheets

STACCATO PULSE EDGE CORRELATION

FIELD OF THE INVENTION

This invention generally relates to multipath mitigation in Direct Sequence Spread Spectrum (DSSS) Code Division Multiple Access (CDMA) ranging systems, but applies to other types of ranging signals and communications systems as well.

BACKGROUND TO THE INVENTION

Radio navigation signals are used to measure range between a transmitter antenna and receiver antenna. In many environments, the transmitted radio navigation signal is reflected from objects around the transmitter and/or receiver antennae and/or along the transmission path. In this type of environment, the resultant received radio navigation ranging signal is a combination of all of the radio navigation ranging signals including reflected signals and the desired direct signal. This combination of multiple radio navigation ranging signals, called multipath, corrupts the radio navigation ranging signals and therefore degrades the accuracy of the range measurement. Multipath is a significant error source in radio navigation systems.

Direct Sequence Spread Spectrum Code Division Multiple Access Radio Navigation A common radio navigation signal structure is Direct Sequence Spread Spectrum (DSSS) Code Division Multiple Access (CDMA). Radio navigation systems such as the Global Positioning System (GPS), the proposed Galileo system, and the Russian built GLONASS system all use a DSSS CDMA radio navigation signal. With the DSSS CDMA signal, the transmitted signal is continuous, not pulsed, and is spread by a digital spreading sequence within the transmitter during the generation of the radio navigation signal. A receiver, knowing the digital spreading sequence, can then despread the radio navigation signal if the same digital spreading sequence is applied to the incoming signal in time alignment with the transmitted radio navigation signal. That is, the digital spreading sequence applied to the radio navigation signal within the receiver must be applied at the same location in the received signal as it was applied to the signal in the transmitter. In terms of time, this means that the digital spreading sequence is applied in the receiver at the same time as it is applied within the transmitter corrected for the flight time.

The digital representation of the radio navigation signal is modulated with the digital spreading sequence. The radio navigation signal is received by the receive antenna then converted to a digital signal. A typical radio navigation receiver converts the signal from the radio frequency (RF) to an intermediate frequency (IF). The signal is then sampled with an Analog to Digital Converter (ADC) to provide the digital representation, or digital samples, of the radio navigation signal. There are numerous mathematical processes for applying a digital spreading sequence to a received signal such as correlation, convolution, match filtering, and Fast Fourier transformations (FFTs). For the purposes of describing the present invention, the term correlation is used as a generalization for all the mathematical process of applying the digital spreading sequence to the received radio navigation signal.

The digital spreading sequence must be applied to the received radio navigation signal at the transmit time corrected for the flight time to properly recover the radio navigation signal generated by the transmitter. However, in a ranging system the flight time is generally not known. Therefore, the receiver must search through the possible time offsets of the digital spreading sequence to find the precise time offset that provides the correct recovery of the original radio navigation signal generated within the transmitter. During this search process, the recovered radio navigation signal is only available when the digital spreading sequence is time aligned to within plus or minus one (1) element, or chip, of the digital spreading sequence. Outside of this one (1) chip plus or minus receiver time alignment, the resulting recovered signal is not the original radio navigation signal generated by the transmitter, but is instead noise. When within the one (1) chip plus or minus receiver time alignment, the power of the recovered radio navigation signal varies across the two-chip validity range with a known pattern. For the mathematical process of correlation, the power of the recovered radio navigation signal across this two-chip span is termed the auto correlation response function, or simply the correlation response function.

When correlating uncorrupted, full bandwidth, CMDA signals, the correlation response function in the time domain is substantially a triangle. The peak of the triangle, or the maximum value of the correlation response function, is interpreted by the receiver as a direct measurement of the time the receiver obtained the radio navigation ranging signal. The shape of the correlation response function is controlled by the filtering and sampling capabilities of the receiver and by the noise floor. Increased filtering rounds off the top of the triangle and decreases the width across the base. Limited sampling capability in the receiver and the overall noise floor push the correlation response function triangle shape down into the noise. None of these effects change the location of the maximum correlation response function power.

The effect of multipath on the correlation response function is to distort the response function, often involving moving the maximum of correlation response in time, and therefore creating an error in the resulting range measurement. Multipath distortion may also increase or decrease the amplitude of the correlation response function, increase or decrease the time span of the correlation response function, and/or change the shape of the correlation response function.

The optimal time delay measurement of the radio navigation ranging signal is the peak or maximum value of the correlation response function. Determining the exact peak power requires exact knowledge of the receive time of the incoming radio navigation ranging signal to allow placement of the correlation response function power detector in the exact maximum time delay location. To avoid this problem, a typical GPS receiver takes power measurements at half a chip early and half a chip late timing relative to the peak. The code tracking loop balances the power between these two time-delay locations on the correlation response function, thereby providing an estimate of the peak as half way between the early and late balanced power measurement in the correlation response function. The spacing of these correlation response function power measurements can vary from the +/− half chip spacing described above. Some receivers use a narrower spacing, for example +/−0.1 of a chip. However, the basic function of balancing the power between the early and late correlation response function power is the same. This technique in effect finds the centroid of the correlation response function and uses that as the estimate of the maximum correlation power, and hence it forms the basis of the range estimate.

When the correlation response is distorted with multipath, the estimated peak value of the correlation response is in error because of the distortion in power measurements along the correlation response function. When power measurements are distorted, the code tracking loop attempts to balance the power between two incorrect power estimates and therefore incorrectly identifies the multipath-free correlation peak.

For illustrative purposes, FIG. 1 shows the two correlation response functions for an ideal CDMA radio navigation signal of the prior art incorporating: a) the theoretical, non-filtered correlation response function 101 and b) the practical, filtered correlation response function of a typical navigation receiver 102. The center 104 of the received correlation response function is in the same time delay location as the centre 103 of the non-filtered theoretical correlation response function. FIG. 2 shows the same two correlation responses of FIG. 1; however the received signal in this case has the same direct signal plus a 0.5 chip delay multipath signal at −6 dB relative to the direct signal. For both depictions in FIG. 1 and FIG. 2, the theoretical curve has no data noise, perfect code alignment, and no filtering of the received signal. The observed practical curve has data noise and a two-sided filter bandwidth of 20 MHz. It is clear from FIG. 2, that the resulting range measurement derived from a balanced power measurement of the correlation response function will be corrupted by the multipath component of the received signal.

Conventional DSSS CDMA radio and radio navigation systems, such as GPS, use continuously broadcast signals. Therefore, the direct and multipath signals are both continuously present in the samples that are used in the correlation process. With continuous signals there is no provision for separating the multipath component of the broadcast radio navigation signals from the direct component. Various techniques for multipath mitigation in DSSS CDMA radio navigation systems have been proposed. One such prior art system varies the relative location of the correlation response function power measurements (Pseudorandom Noise Ranging Receiver Which Compensates for Multipath Distortion by Dynamically Adjusting the Time Delay Spacing Between Early and Late Correlators, Fenton et al., U.S. Pat. No. 5,390,207, Feb. 14, 1995). However, this technique requires large receiver bandwidths to operate correctly and cannot separate the multipath from the desired direct signal based on the location of the power measurements on correlation response functions as described in FIG. 2. Another common multipath mitigation technique utilizes post correlation signal-to-noise ratios (Axelrad, P., C. J. Comp, and P. F. MacDoran, "SNR Based Multipath Error Correction for GPS Differential Phase," *IEEE Transactions on Aerospace & Electronic Systems*, in press) which also suffers from an inability to separate the multipath from the desired direct signal based on the location of the power measurements on correlation response functions as described in FIG. 2. Another method utilizes post correlation equalization weighting of the response function power estimates to refine the optimal time delay measurement, such as implemented in a rake demodulator (Proakis, *Digital Communications*, Fourth edition, McGraw-Hill, 2001). However, this technique requires complicated receiver circuitry to operate correctly, and also suffers from an inability to separate the multipath from the desired direct signal based on the location of the power measurements on correlation response functions as described in FIG. 2. All of these prior art multipath mitigation techniques rely on minimizing the impact of multipath signals after the signals have already been absorbed into the correlation process. As shown by the depiction in FIG. 2, techniques that rely on post-correlation power responses will be corrupted with continuous multipath. It is clearly not possible to distinguish the multipath-corrupted signal of FIG. 2 from the direct-only signal of FIG. 1 by changing the relative location of the post-correlation power response measurements.

Radio Navigation Systems Utilizing Pulsed Signals

A pulse is defined as a burst of electromagnetic energy that has limited duration. A pulsed radio navigation signal is comprised of periods where a signal is present, and periods where the transmitter is emitting substantially no output power and therefore a signal is absent.

Previous work on pseudolites (ground based transmitters that generate signals similar in structure to GPS satellite signals) used a pulsing scheme with a long time scale relative to the correlation time. For example, a common pulsing scheme for pseudolites is defined by the Radio Technical Commission for Maritime (RTCM) proposal of 1986 (Parkinson et al., Global Positioning System: Theory and Application, Vol II, AIAA Press, 1996). In this pulsing scheme each full code cycle is divided into eleven (11) slots. Designed for the GPS C/A code, this pulsing scheme resulted in transmitting continuously for 93 chips of the 1023 chip sequence and remaining silent during the remaining code duration. During the next 1023 chips cycle, a different 93 chip sequence would be broadcast. The location of the 93 broadcast chips varied with a known pseudorandom pattern. This pulsing scheme was utilized to minimize the impact of the so-called near-far problem. Although this pulsing scheme reduced the impact of the near-far problem, it did nothing to provide multipath mitigation.

Pulse based radio navigation signals such as Ultra Wide Band (UWB) utilize a pulsing scheme to mitigate multipath (Full Duplex Ultrawide-Band Communication System and Method, Fullerton, U.S. Pat. No. 5,687,169, Nov. 11, 1997 or Time-of-flight Radio Location System, McEwan, U.S. Pat. No. 5,661,490, Aug. 26, 1997). UWB systems broadcast short pulses and provide the capability for both communications and ranging. However, as the name implies, UWB systems spread the broadcast energy in the pulse over a large section (or sections) of radio spectrum. At the core of ranging algorithms for UWB is the detection of the leading edge of the transmitted pulse by measuring the received energy in the radio navigation signal's RF component.

Accurately detecting the leading edge of a pulse requires an extremely wide bandwidth. Typical UWB systems utilize 1 GHz of bandwidth. This is very wide compared to DSSS CDMA systems such as GPS that typically only utilize between 2 and 20 MHz. For pulsed signals, the rise time of the leading edge of the pulse is proportional to the bandwidth. For wide bandwidth signals, the rise time of the pulse is short, allowing for precise timing of when the received power rises above a predetermined threshold. Therefore accurate range determination is possible. For bandwidth limited pulsed signals, the rise time is relatively long resulting in a gradual increase in the power observed in the leading edge of the pulse. With the gradual increase in power, accurately determining the exact beginning of the pulse is impractical.

An alternate UWB technology developed by Aetherwire (Spread Spectrum Localizers, Fleming et al., U.S. Pat. No. 6,400,754, Jun. 4, 2002) utilizes Direct Sequence CDMA (DS-CDMA) providing processing gain from the CDMA processing. The CDMA processing described by Fleming provides a navigation receiver with the capability of computing range measurements from the flight time of the DS-CDMA signal in a manner similar to that described above for GPS. This method further removes the constraint of detecting the leading edge of the pulse. However, the fundamentally large bandwidth requirements of UWB make the technology impractical in many ranging applications. Additionally, the pulsing pattern of Fleming's preferred embodiment utilizes a 10 nanosecond chip length and a code sequence of 1024 chips, which results in a total time of reception of about 10 microseconds. This form of pulsing pattern does not allow sufficient time for multipath to dissipate prior to beginning the transmission of the subsequent chip.

Prior art multipath mitigation techniques in CDMA radio navigation rely on continuous correlation of either continuous or pulsed signals, thereby including the multipath component of the signal in the correlation response function. These prior art techniques are intrinsically limited because the desired direct signal and the undesired multipath signals are conjoined during the correlation process, and therefore become difficult to separate within post-correlation processing. Prior art radio navigation systems that utilize the detection of the leading edge of a pulse to determine range require large signal bandwidth to provide accurate range measurements. This is due to the required rapid rise times in the received pulses.

There is clearly a need for a radio navigation system that can mitigate the deleterious effects of multipath on ranging signals but which does not require (a) large tracts of radio spectrum, (b) large receiver bandwidths, or (c) post-correlation power response interpretation. The present invention achieves these desirable goals by digitally separating the desired direct signals from the undesired multipath signals, prior to the correlation process. This is achieved without requiring special antennas or additional bandwidth beyond that typically utilized by DSSS CDMA radio navigation systems.

OBJECT OF THE INVENTION

It is an object of the present invention to provide a system and method for making range estimates in CDMA DSSS radio navigation system receivers so that the multipath component of the range estimate is mitigated prior to correlation.

It is yet a further object of the present invention to provide a system and method for broadcasting a pulsed CDMA DSSS radio navigation signal such that portions of the radio navigation signal are substantially free of multipath.

It is yet a further object of the present invention to provide a system and method for broadcasting a pulsed radio navigation signal such that the pulsed radio navigation signal is processed as a continuous signal.

It is yet a further object of the present invention to provide a system and method for separating digital samples of a received radio navigation signal, such that the samples that are substantially corrupted with multipath are processed separately from those signals that are substantially multipath free.

It is yet a further object of the present invention to provide a system and method for processing digital samples of a radio navigation signal in a radio navigation receiver synchronously with a pulsed radio navigation signal. It is yet a further object of the present invention to provide a system and method for estimating individual code delays from the separate processing of digital samples within a radio navigation receiver when the digital samples are processed synchronously with a received pulsed radio navigation signal.

It is yet a further object of the present invention to provide a system and method for providing multipath mitigation in limited bandwidth receivers.

It is yet a further object of the present invention to provide a system and method for generating range estimates from correlations derived only from the leading edges of pulsed CDMA DSSS radio navigation signals.

It is yet a further object of the present invention to provide a system and method for providing multipath mitigation in limited bandwidth receivers without the requirement of special antennas.

SUMMARY OF THE INVENTION

The present invention discloses a system and method for mitigating multipath in DSSS CDMA radio navigation signals by a) transmitting a rapid pulsing pattern from a transmitting device to a position receiver that samples the transmitted signal, b) separating the received samples and storing sample-based correlation accumulation values into independent bins that are synchronous with the received pulsing pattern, c) applying a logical decision process to determine the accumulation bin associated with the leading edges of the received pulses, and d) generating a range estimate from the correlation accumulation bin associated with the leading edges of the received pulses.

SYSTEM AND METHOD

Figure 1:
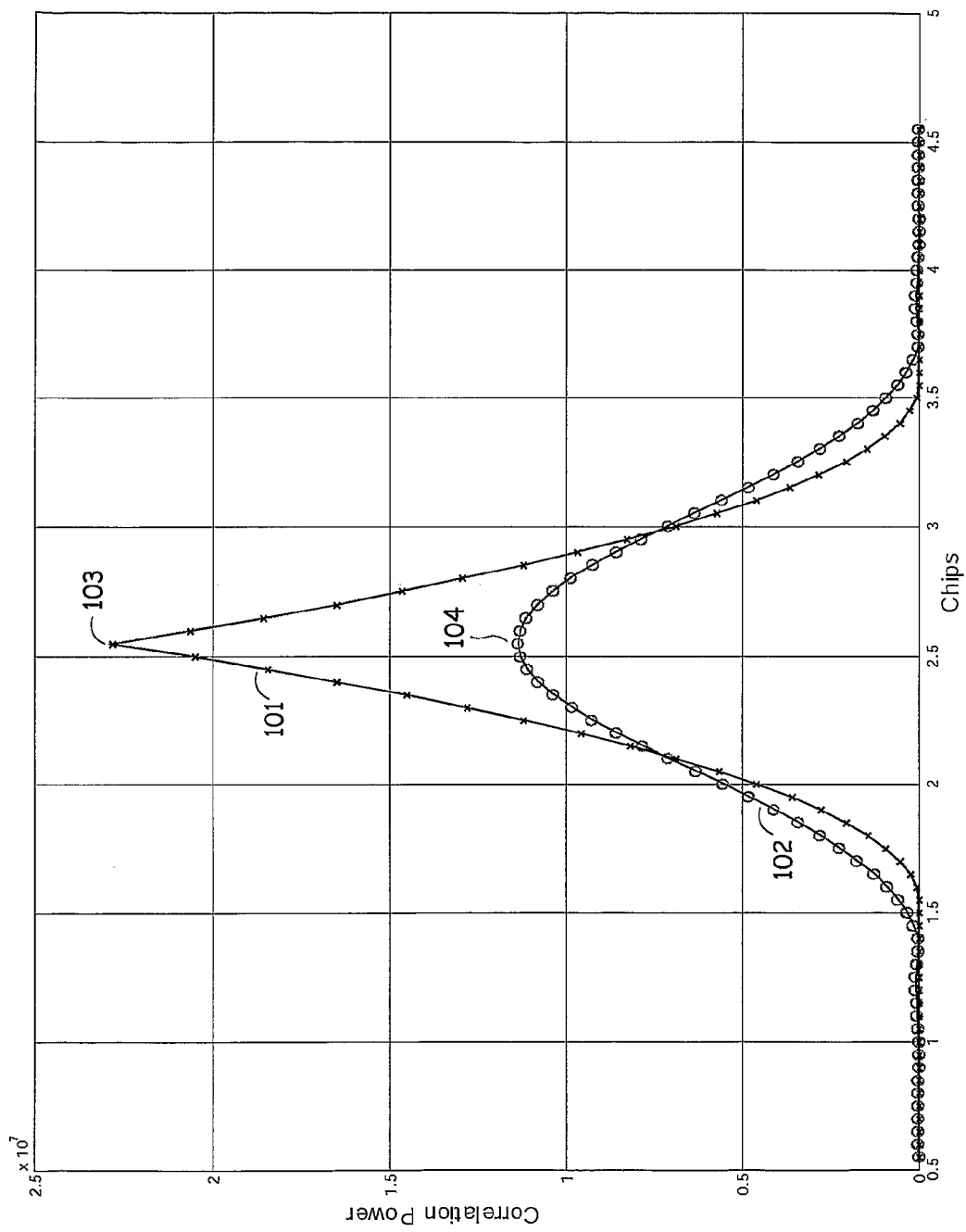
FIG. 1. depicts prior art autocorrelation responses as a function of code delay timing for an ideal DSSS CDMA radio navigation signal processed through an ideal infinite bandwidth receiver and the same ideal DSSS CDMA radio navigation signal processed through a limited bandwidth receiver.

The present invention discloses the transmission of short, rapid pulses of DSSS CDMA signals to provide time between pulses for multipath signals to dissipate prior to the beginning of subsequent pulses. Short, rapid pulses allow a radio navigation receiver to receive and interpret the train of short pulses as a continuous DSSS CDMA signal, yet still provide for quiet periods between pulses where the multipath components can dissipate. The present invention further separates received samples supplied to the correlation process such that samples associated with the leading edge of each pulse are processed independently from those samples that occur later in each pulse period, and which are therefore more susceptible to multipath corruption. The short pulses are processed as a continuous stream of samples providing the same advantages of DSSS CDMA signals that are present in continuously broadcast DSSS CDMA systems.

Pulsing Scheme

In the preferred embodiment, a pulsing scheme of one (1) chip on and two (2) chips off is used to describe the present invention. For illustration of this pulsing scheme, a chip rate of 10 M-chips/sec is chosen. Consequently, the pulse duration is approximately 100 nanoseconds (approximately 30 meters) followed by a 200 nanosecond quiet period. During the two chip quiet time, the multipath signals generated from any reflections of the one chip pulse subside. The nature of the correlation process rejects multipath signals longer than 1.5 chips. Therefore, a two chip quiet period allows sufficient time for the short multipath (i.e. less than 1.5 chips) to dissipate. The correlation process will reject the multipath signals with a delay longer than two chips. An alternative embodiment utilizes a pseudorandom pulsing scheme to mitigate any modulation effects that might be generated from the fixed one chip on, two chips off pattern. This pseudorandom pulsing pattern would maintain sufficient quite time between pulses to allow the short multipath signal components to dissipate prior to beginning the subsequent pulse. Other pulsing and chipping schemes, such as those that are not synchronized with the chip pattern, can also be employed and fall within the broad scope and ambit of the present invention.

Leading Edge and Sample Processing

The present invention separates the received data samples and correlation accumulation values within a radio navigation receiver in synchronicity with the timing of the received pulsed signal. When data samples and correlation accumulation values are separated synchronously with the received pulsing pattern, the leading edge of the received pulse can be processed independently from the remainder of the received signal. The leading edge of the received pulse is less corrupted by multipath than the remainder of the received pulse, or the pure multipath signal occurring after the end of the reception of the pulse. Therefore, the range estimate derived from the leading edge samples will be less corrupted by multipath than the samples occurring later during the pulse cycle.

The correlation process of the present invention accumulates and stores correlation power response values in a plurality of correlation process accumulation bins. Each correlation process accumulation bin has a specific timing relationship with the received pulsing pattern. This is in contrast to a conventional correlation process that accumulates and stores all correlation results in a single bin. In both the conventional correlation process and the present invention, the received radio navigation signal is converted to a stream of digital samples and the digital samples are modulated with a digital spreading sequence. In the conventional correlation process, the resulting modulation of the digital samples and digital spreading sequence are summed together and the result stored in a correlation process accumulation bin. This modulation and accumulation occurs sequentially as each digital sample is collected or occurs after the collection of the digital samples. The common element in conventional correlation processing is that results of modulating digital samples with digital spreading sequences are all accumulated into a single correlation process accumulation bin, independent of the relative timing of the received digital samples. With the pulsed transmission of the present invention, each digital sample has different direct and multipath signal content. Therefore, separating the digital samples in the correlation processing according to the relative position of the pulsing pattern provides a method for analyzing these different contents.

Figure 3:
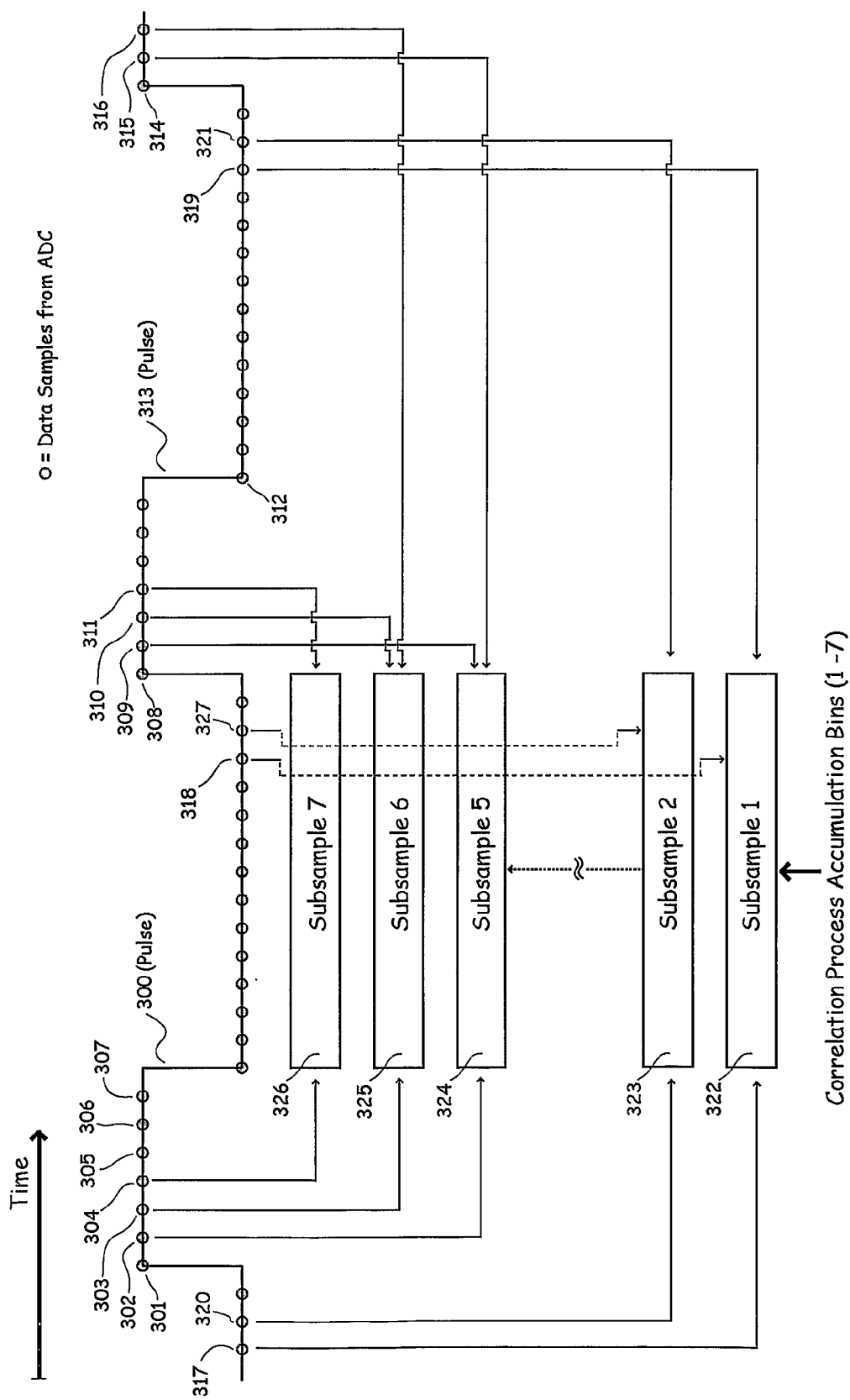
FIG. 3. depicts the relationship between the timing of digital samples taken within a radio navigation receiver of the present invention, wherein the sampling interval is synchronous with the pulsing rate of the received pulsed radio navigation signal. A received pulsed radio navigation signal pulse pattern, correlation processing, and a plurality of correlation accumulation bins used to separate the digital samples into bins that are synchronous with the pulsing pattern are also depicted.

Referring now to FIG. 3 there is depicted an illustrative example of the correlation process of the present invention, wherein two pulses 300 and 313 are depicted as a function of time. The pulses, 300 and 313 are the transmitted pulse on/off timings and not the chip pattern generated by the digital spreading sequence. This depiction illustrates the one (1) chip on and two (2) chip off pattern of the preferred embodiment. Further, the receiver of the preferred embodiment is configured to provide a sample rate of 70 M-samples/sec, for processing a received radio navigation signal with a DSSS CDMA code chipping rate of 10.023 M-chips/sec and a pulse rate of 10 M-pulses/sec. Therefore, for each of the complete one (1) chip on pulses 300, 313 shown in FIG. 3 the receiver generates seven (7) data samples. These are shown in received time sequence relative to the pulsing pattern and are numbered 301, 302, 303, 304, 305, 306 and 307 for pulse 300. All samples taken from the received signal are illustrated as dots along the illustrated signal line and indexed on FIG. 3 as "Data Samples from ADC". In the example illustrated in FIG. 3, samples 301, 308 and 314 correspond to the beginning of a pulse, samples 302, 309 and 315 correspond to the second sample of a pulse, samples 303, 310 and 316 correspond to the third sample of a pulse, and so on through the stream of samples. Sample 307 corresponds to the last sample of the pulse 300. Further, all samples on the illustrated time line containing samples 317, 320, 318, 327, 312, 319 and 321 correspond to the quite time between pulses.

Sample 317 is the arbitrary starting time and data sample for separating the incoming samples into correlation process accumulation bins synchronized with the pulsing pattern. Thus sample 317 accumulates into Subsample 1 correlation process accumulation bin 322, sample 320 accumulates into Subsample 2 correlation process accumulation bin 323 and continuing through the sequence where the fifth sample in this sequence, sample 302 accumulates into Subsample 5 correlation process accumulation bin 324, the sixth sample in this sequence, sample 303 accumulates into Subsample 6 correlation process accumulation bin 325, and the seventh sample in this sequence, sample 304 accumulates into Subsample 7 correlation process accumulation bin 326. The next sample in this sequence synchronized with the pulsing pattern, sample 318, is the first of the next sequence of seven samples. It has the same timing relative to the pulse pattern as sample 317 and therefore accumulates into Subsample 1 correlation process accumulation bin 322. All samples with the same timing relative to the pulse pattern as sample 317 (in this example samples 318 and 319 are shown for illustration) accumulate into Subsample 1 correlation process accumulation bin 322.

Similarly:

Subsample 2 correlation process accumulation bin 323 accumulates all samples with the same timing relative to the pulse pattern as sample 320 (in this example samples 327 and 321 are shown for illustration);

Subsample 5 correlation process accumulation bin 324 accumulates all samples with the same timing relative to the pulse pattern as sample 302 (in this example samples 309 and 315 are shown for illustration);

Subsample 6 correlation process accumulation bin 325 accumulates all samples with the same timing relative to the pulse pattern as sample 303 (in this example samples 310 and 316 are shown for illustration);

Subsample 7 correlation process accumulation bin 326 accumulates all samples with the same timing relative to the pulse pattern as sample 304 (in this example sample 311 is shown for illustration);

and so on.

The correlation process of the present invention may accumulate and store the accumulation values in the subsampled correlation accumulation bins using a variety of methods. For example, if the location of the pulse is known, such as in the above example, there is no need to process samples after the leading edge of the received pulse. In a further embodiment, the correlation process may accumulate a first sample timing 301 during a first correlation accumulation time and a second sample timing 302 during a second correlation accumulation time and continue acquiring samples for a predefined number of bins. The preferred embodiment details utilizing seven (7) accumulation bins with a sample rate of substantially seven (7) samples per chip. In the preferred pulsing scheme, there is one chip of pulse signal with two chips of quite time between the pulsed-on chips. Instead of accumulating the preferred seven (7) bins, the receiver could alternatively accumulate any number of bins by continuing the accumulation pattern beyond the seven (7) bins detailed in the preferred embodiment. In an alternate embodiment, the receiver could accumulate 21 bins to provide a full sampling of the correlation response functions with respect to the entire pulsing pattern. In yet a further embodiment, the receiver could accumulate less than the seven (7) bins detailed in the preferred embodiment. Other correlation and accumulation methods fall within the broad scope and ambit of the present invention.

Sample Timing Relative to the Pulsing Pattern

In the preferred embodiment of the present invention, the sample rate of the navigation receiver is not an integer multiple of the transmitted pulse-rate as is the case illustrated in FIG. 3. The preferred sample-rate is an integer multiple of the pulse-rate plus a fractional component that causes the sampling to slide relative to the received pulses. Sliding the sampling relative to the received pulses reduces any aliasing effects that could be present if all of the samples occurred at the exact same time relative to the received pulses. Therefore, a sample-rate to pulse-rate ratio is dependent on the pulse length. A sample-rate offset relative to the pulse-rate causes the sample locations to vary along the pulse stream. For example, in a 10 M-pulse/sec system as illustrated in FIG. 3, the fractional component of the sample-rate to pulse-rate is an additional 1 sample in every 10,000 pulses. Other sample sample-rate to pulse-rate ratios can also be utilized. For example, 1 additional sample in each 1,000 pulses also produces a relative offset for code lengths of 1,000 to 10,000 chips. Therefore, in the preferred embodiment, if the nominal sample rate were 7 samples per pulse, the preferred sample-rate is adjusted to a rate of between 7.0001 to 7.001 samples per pulse. For slower pulse rates, higher fractional offsets between the sample-rate and pulse-rate are required to vary the sample location along the pulse during the integration time period.

In the preferred embodiment, the sample-rate is not synchronous with the pulse-rate and the samples are not therefore synchronous to the pulsing pattern. However, the correlation accumulation values remain synchronous to the pulsing pattern. This synchronization is achieved with a timer within the receiver programmed to the known transmitter pulse rate. At the expiration of the timer, the receiver issues a pulse time mark providing a reference between the known transmitter pulse rate and the receiver clock. The receiver pulse time mark is used to assign correlation and accumulation bins with an unknown, but constant, offset relative to the received pulse pattern.

Figure 4:
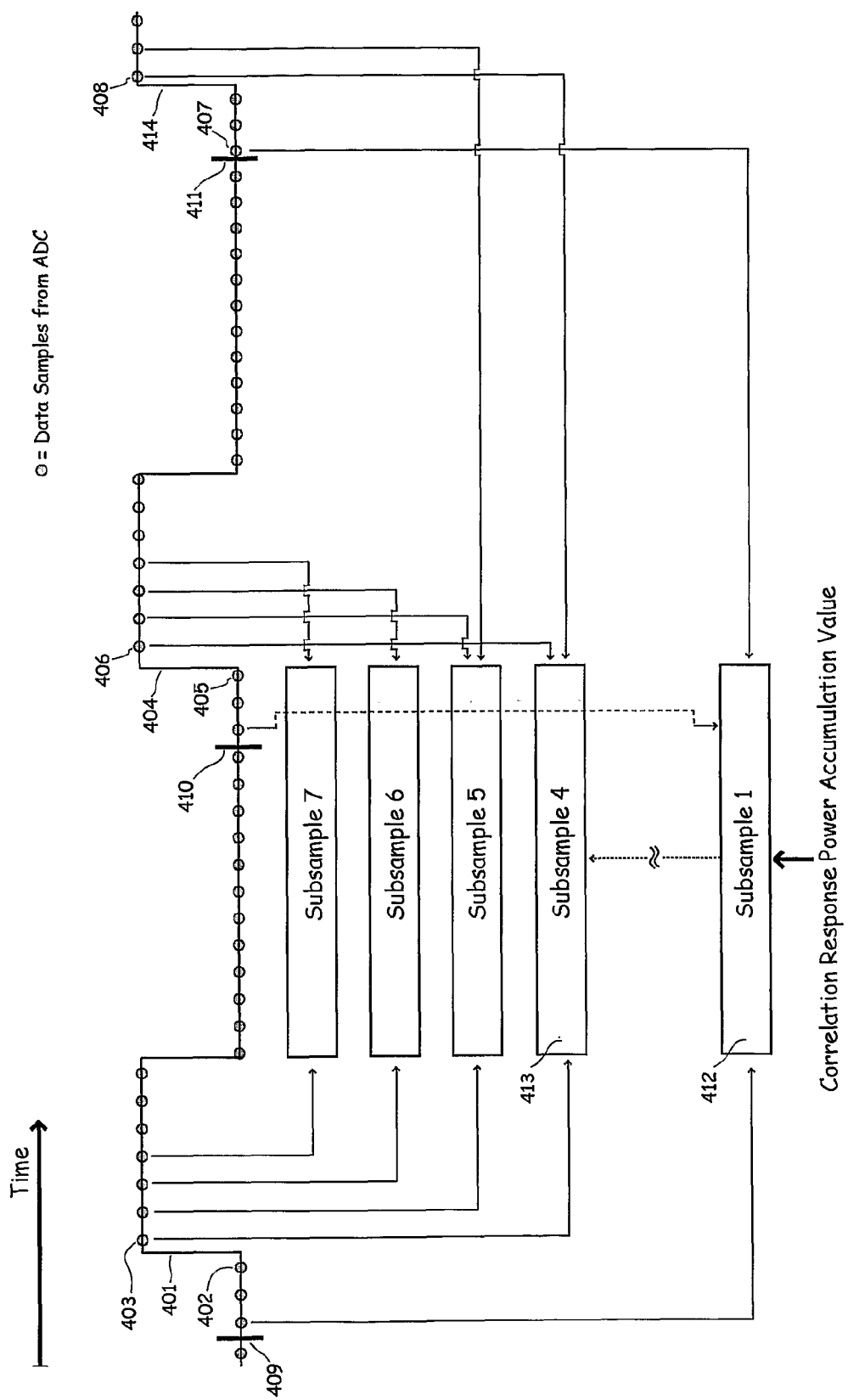
FIG. 4. depicts the relationship between the timing of digital samples taken within a radio navigation receiver of the present invention, wherein the sampling interval is not synchronous with the pulsing rate of the received pulsed radio navigation signal. A received pulsed radio navigation signal pulse pattern, correlation processing, a receiver pulse timer mark, and a plurality of correlation accumulation bins used to separate the digital samples into bins that are synchronous with the pulsing pattern are also depicted.

Referring now to FIG. 4, the digital samples are no longer synchronous with the pulsing pattern as was the case in FIG. 3. A first pulse location, 401, changes relative to the data samples, 402 and 403 at the next pulse location, 404, and the data samples around that pulse 405 and 406. There is a further change in the pulse location 414 between data samples 407 and 408. A first receiver pulse time mark is denoted as 409. Although the absolute location of this receiver pulse time mark, 409, is not known relative to the first pulse location, 401, the relative timing of the two events, 409 and 401, is a constant. For this example, the receiver pulse time mark, 409, is set approximately three data samples prior to each pulse 401, 404, & 414. Although the data sample alignment relative to both the receiver pulse time mark, 409, and the pulse location, 401, varies, the alignment between the receiver pulse time mark, 409, and the pulse location, 401, remains constant. For this example, the first data sample, past the receiver pulse time mark, 409, is accumulated into Subsample 1 accumulation bin 412. Each subsequent sample is processed and the correlation accumulation values are placed into the subsequent correlation and accumulation bins relative to the internal time mark.

A Priori Timing Estimates

In the preferred embodiment, conventional correlation processing is used to obtain approximate code delay timing and approximate knowledge of the pulsing pattern. Although these estimates of the code delay timing and pulsing pattern are corrupted with multipath, rough estimates of the code delay timing, to within +/−1.5 chips of the pulsing pattern, are possible. The rough estimate of the code delay timing is subsequently used as input to the sub-sampled correlation process to set the initial value of the code delay timing. Other methods, such as sub-sampled correlation searches or raw pulse searches, for obtaining code delay timing estimates and pulsing pattern knowledge, fall within the broad scope and ambit of the present invention.

It is not, in general, possible to precisely synchronize the receiver time mark pulse with the received pulse pattern. Synchronization with the received pulse pattern is only as accurate as the range estimate to the transmitter. Precise knowledge of the pulse pattern requires precise knowledge of the range to the transmitter. The range to the transmitter is, in general, unknown in a positioning device prior to computing an accurate position. Therefore, a search for the leading edge of the pulse is required. This search encompasses the sub-sampled correlation processor accumulating a number of sample timings in separate accumulation bins relative to the radio navigation receiver pulse time mark; each accumulation bin represents a potential received pulse leading edge. Referring again to FIG. 3, the sample timing of this illustrative example was chosen such that the first few samples occurred prior to the start of a pulse. Using conventional correlation techniques, an approximate timing for the leading edge of the received pulse pattern is first determined, which can then provide a rough placement for a radio navigation receiver time mark relative to the received pulse pattern. In the example in FIG. 3. a radio navigation receiver time-mark timer would be set such that the time-mark was initialized approximately three (3) samples prior to a received pulse. From the set of time-mark correlation accumulation bin results, a logical decision process determines the correct, or most probable, pulse leading edge sample set. In general, the placement of the receiver time-mark must be placed based on the uncertainty in the rough estimate of the code delay timing.

Logical Decision Process

A logical decision process determines the correlation accumulation bin that corresponds to the received pulse leading edge. In the preferred embodiment, the decision process utilizes accumulation power values from each correlation accumulation timing bin. However, other measurement parameters such as signal-to-noise ratio, In-Phase and Quadrature (I&Q) tracking loop carrier tracking loop accumulation values, pseudorandom code tracking loop measurements, and similar data available within the receiver may be used and fall within the broad scope and ambit of the present invention.

Figure 5:
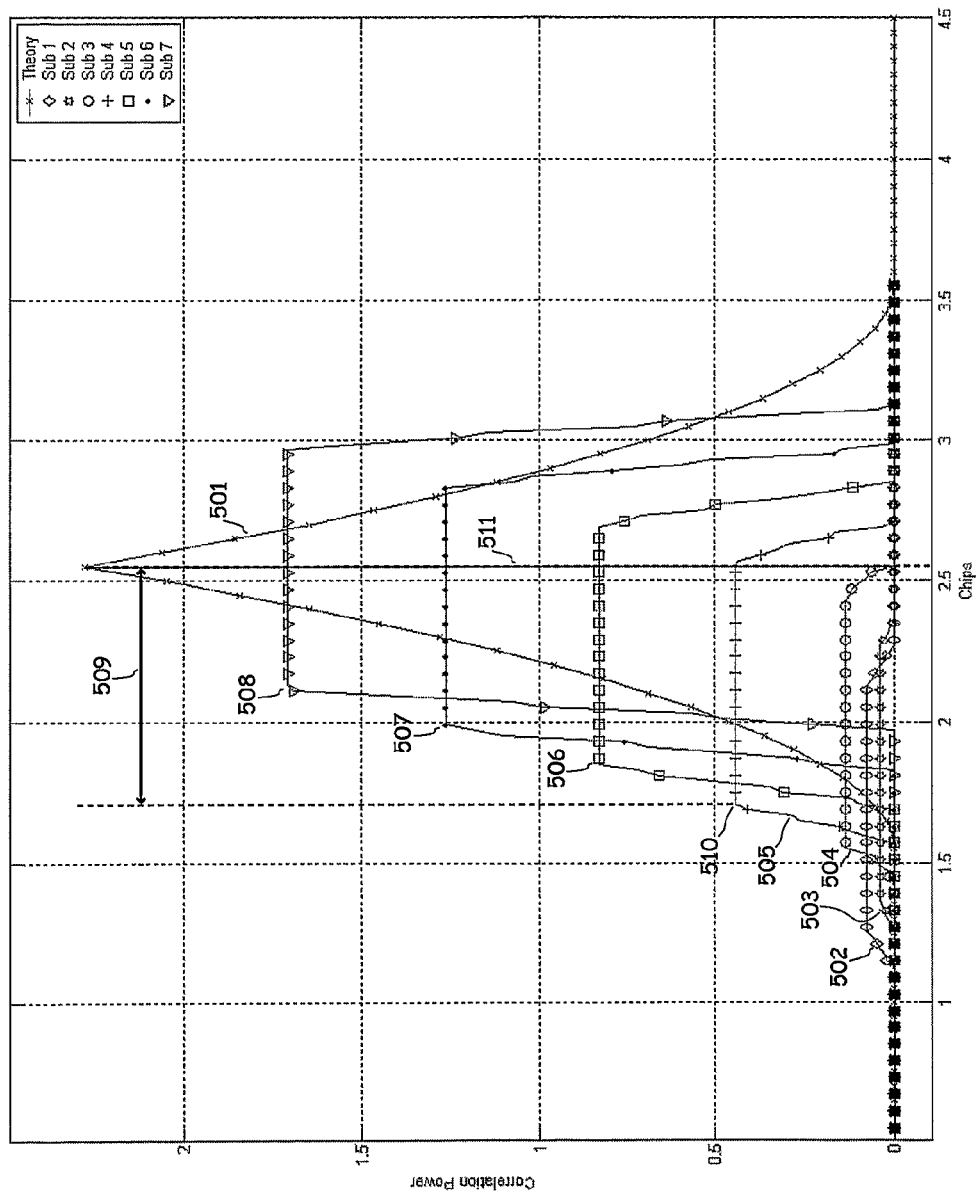
FIG. 5. depicts sub-sampled autocorrelation response functions of the present invention using a bandwidth limited DSSS CDMA pulsed radio navigation signal.

Referring to FIG. 5, there is depicted an illustrative example of 7 sub-sampled correlation response functions 502, 503, 504, 505, 506, 507, and 508, according to the present invention, together with a conventional correlation response function 501. Correlation response function 501 is the theoretical conventional correlation response with no filtering or data noise. The sub-sampled correlation response functions 502, 503, 504, 505, 506, 507, and 508 are filtered with a 20 MHz bandwidth filter as described in the preferred embodiment, and the signal is corrupted with both noise and multipath. The theoretical response function 501 and sub-sampled correlation response functions 502, 503, 504, 505, 506, 507, and 508 have been scaled such that all are clearly visible on the same plot. The sub-sampled correlation response functions 502, 503, 504, 505, 506, 507, and 508 are distinct from the conventional correlation response function 501 in that they are flat, with constant power in the time dimension, instead of a triangular shape with a peak power at the maximum correlation value. The sub-sampled correlation response functions 502, 503, 504, 505, 506, 507, and 508 are the decomposition of the conventional correlation response function 501. Referring to the leading edge of the conventional correlation response, 501, it is readily evident that the sum of the sub-sampled correlation response functions, 502, 503, 504, 505, 506, 507, and 508, would result in a conventional correlation response function. If further sub-sampled correlation response functions were depicted at the trailing edge of the conventional correlation response function, these would also sum to the conventional correlation response function.

In the example in FIG. 5, the logical decision process compares seven (7) sub-sampled correlation and accumulation response functions, 502, 503, 504, 505, 506, 507, and 508 to select sub-sampled correlation response function corresponding to the received pulse leading edge. Using the a priori estimate of the received pulse timing from the conventional correlation processing, a receiver pulse time mark is aligned such that nominally three (3) correlation accumulation bins occur prior to the estimate of the received pulse leading edge and the remaining four (4) correlation accumulation bins occur after the received pulse leading edge. In the preferred embodiment, seven (7) samples surrounding the received pulse leading edge are processed into their corresponding correlation accumulation bins. Alternative embodiments vary the number of correlation and accumulation bins required to insure that the received pulse leading edge is observed based on the specific application, environment, and receiver measurement and clock quality. For example, in low multipath environments where the rough estimate of the code delay timing is known to be within a quarter of a chip the full seven (7) subsample correlation accumulation bins would not be required. Instead, only three (3) or four (4) bins would be required. Further, if the receiver clock uncertainty was large compared to the rough estimate of the code delay timing, then additional samples beyond the seven (7) subsample correlation accumulation bins described for the preferred embodiment would be required.

In the preferred embodiment, a set of comparison criterion is established based on the accumulation bin relative power and location relative to the radio navigation receiver pulse time-mark. For example, the power value of the leading edge correlation accumulation bin is expected to be higher than the previous correlation accumulation bin power value by some ratio because the previous correlation accumulation bin is accumulated from samples that contain only noise. For the results illustrated in FIG. 5, sub-sample correlation power response curve 505 corresponds to the sample timing of the leading edge. The sub-sample correlation power response at the leading edge of the pulse, 510 is approximately 3.5 dB higher than the previous, noise only sub-sample correlation power response curve, 504. Additionally, as is shown in FIG. 5, the subsequent sub-sample correlation power response curve, 506, is expected to be higher than the leading edge sample correlation power response curve, 505. This increase in correlation power is due to a filtering effect caused by the reception of band-limited signals, thus creating a ramp-up of the pulse. This results in the signal increasing in power as the pulse is initially transmitted.

Other logic processes and decision criterion are possible to establish the first sub-sample on the pulse edge, such as setting specific signal to noise (SNR) ratio thresholds, processing carrier tracking loop In-Phase and Quadrature (I&Q) data, processing pseudorandom code tracking loop measurements, or processing similar data available within the receiver. These decision criterions can also change when calibrated against real data signals from different types of transmitters received with different receiver configurations. Further, the process of selecting the leading edge correlation and accumulation bin can be dynamically adjusted within the receiver as the specific environment and signals are observed for general or specific multipath content. The correlation accumulation bin corresponding to the best estimate of the leading edge of the received pulse pattern is then used to estimate the range measurement.

Pseudorange Measurement from Leading Edge Sample Correlation Accumulation Results Once the leading edge sub-sample correlation and accumulation bin is determined, a range estimate based on that correlation accumulation bin is determined. In the preferred embodiment, a data fitting algorithm estimates the edge of the plateau, element 510 in FIG. 5, to determine a range measurement. This plateau edge is the basis of the range measurement derived from the sub-sample correlation power response, 505. In the preferred embodiment, the data fitting algorithm uses a sample point on the rising edge of the sub-sampled correlation response and the maximum value of the correlation response. In the preferred embodiment, conventional 0.5 chip early and 0.5 chip late tracking arms are used to obtain the two required sample points. In a further embodiment, a combination of the early, late, and prompt tracking arms may be used to required sample points. In yet further embodiments, narrow tracking arm spacing such as 0.1 of a chip or non-symmetric tracking arm spacing is used. For the preferred embodiment, the slope of the leading edge of the sub-sampled correlation response is calibrated from a Monte-Carlo simulation of many sub-sampled correlation response curves given a wide variety of signal conditions. Other techniques for establishing the range from the sub-sample correlation response function such as laboratory experiment, field qualification, and mathematical modeling fall within the broad scope and ambit of the present invention.

Referring again to FIG. 5, a systematic bias, 509, exists between the range estimate derived from the leading edge of the pulse, 510, and the maximum response of the conventional correlation response, 511, traditionally used as the basis of the range estimate. In the preferred embodiment, this bias is calibrated and maintained as a constant within the receiver. Optionally, this bias can be modeled on a continuous basis.

Figure 2:
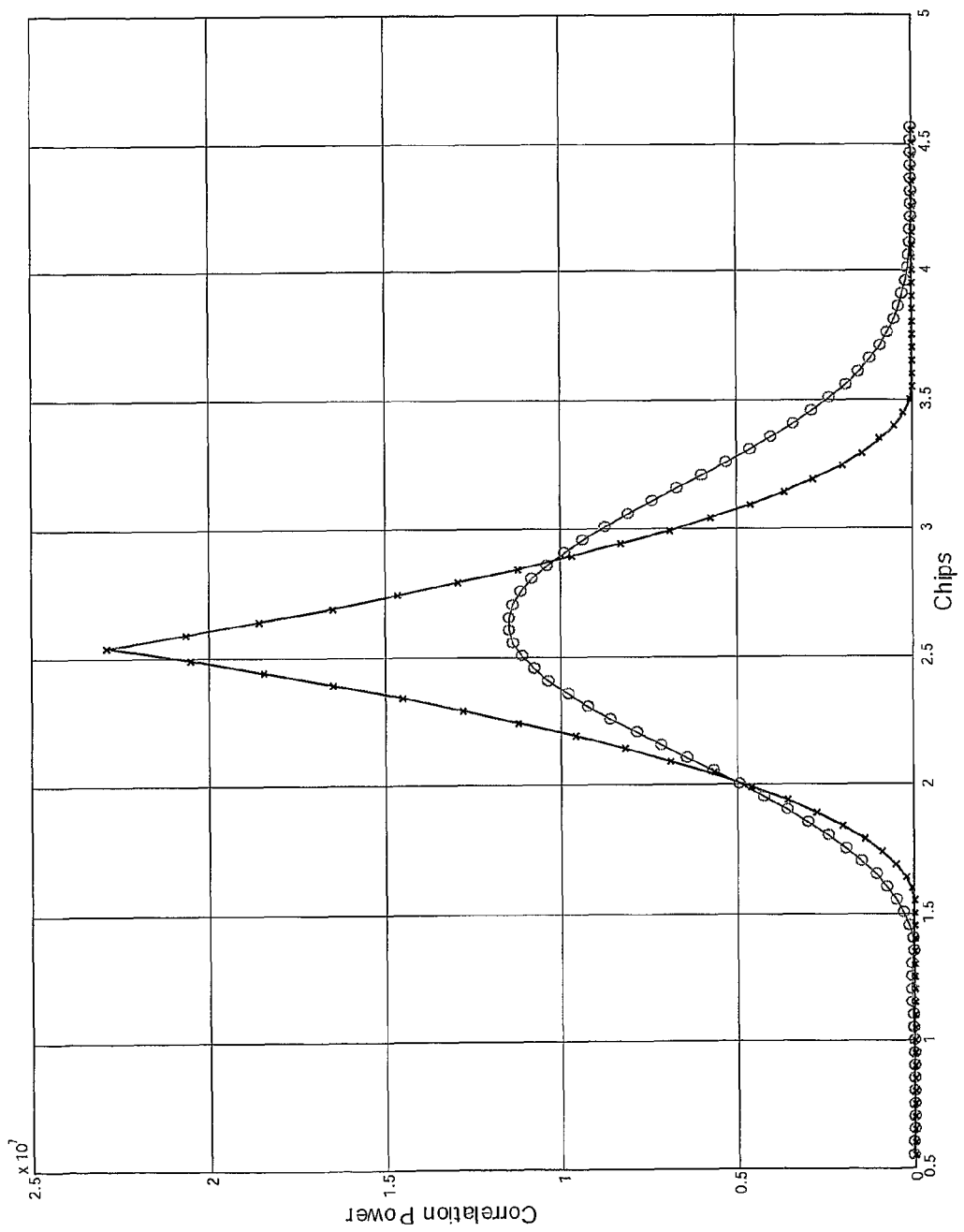
FIG. 2. depicts prior art autocorrelation responses as a function of code delay timing for an ideal DSSS CDMA radio navigation signal corrupted with a single multipath signal delayed by one half a code chip and 6 dB below the direct signal. The correlation response function for this multipath corrupted signal is processed through a limited bandwidth receiver.

In FIG. 5, the correlation accumulation bin values of this technique with a preferred sample-rate of 7.001 samples per chip and the sub-sampled response functions are shown. The multipath in this illustrative example is the same as that depicted in FIG. 2 of 0.5 chip delay at −6 dBm. The error in the estimate of the range is approximately 2 cm for this multipath scenario using the sub-sampled correlation accumulation bin technique of the present invention, compared to 2-3 meters from a conventional tap spacing correlation method, therefore giving a significant improvement over prior art methods.

It will of course be realized that whilst the above has been given by way of an illustrative example of this invention, all such and other modifications and variations hereto, as would be apparent to persons skilled in the art, are deemed to fall within the broad scope and ambit of this invention as is herein set forth.

What is claimed is:

1. A method of mitigating multipath in a radio navigation receiver, the method including the steps of:
    a) transmitting a rapid pulsing pattern from a transmitting device to a position receiver that samples the transmitted signal;
    b) separating the received samples and storing sample based correlation accumulation values into independent bins that are synchronous with the received pulse pattern;
    c) applying a decision process to determine the accumulation bin associated with the leading edges of the received pulses; and
    d) generating a range estimate from the correlation accumulation bin associated with the leading edges of the received pulses;
such that the multipath of the range estimate is mitigated.

2. A method of claim 1 wherein the rapid pulsing pattern provides sufficient quiet time between pulses to allow multipath signals to dissipate.

3. A method of claim 1 wherein the radio navigation signal utilizing the rapid pulsing pattern is processed as a continuous signal without separating the received samples into independent correlation accumulation bins.

4. The method of claim 1 wherein the position receiver that samples the transmitted signal at a sample rate slides the sample rate relative to the received pulse pattern to reduce aliasing effects.

5. The method of claim 1 wherein the position receiver samples the transmitted signal at a sample rate, and wherein the method further includes timing for generating a pulse time mark, the pulse time mark providing a reference between the rapid pulsing pattern and the sample rate, such that the correlation values remain synchronous with the rapid pulsing pattern.

6. The method of claim 1, further including generating a range measurement comprising the steps of:
    a) obtaining sample points on the correlation response function of the subset of correlation values, the correlation response function including of an increasing ramp followed by a plateau region followed by a decreasing ramp; and
    b) determining the edge of the plateau region using the sample points.

7. A system for transmitting and receiving a pulsed signal to mitigate multipath in a radio navigation receiver, the system comprising:
    a controller configured to generate a pulsed signal having sufficient quiet time between pulses so as to enable multipath signals to substantially dissipate prior to the beginning of subsequent pulses; and
    a transmitter configured to transmit the pulsed signal;
    a receiver configured to receive the pulsed signal, the pulsed signal having a plurality of pulses each of which has a leading edge; and
    a processor of the receiver configured to sample at the leading edges.

8. The system of claim 7, further comprising:
    the processor of the receiver configured to correlate on the leading edge of each pulse of the pulsed signal to generate a correlation; and
    the processor configured to generate a range estimate from the correlation.

9. A method of mitigating multipath in a radio navigation receiver, the method including the steps of:
    a) transmitting a pulsed radio navigation signal from a transmitting device to a radio navigation receiver
    b) correlating on the leading edge of each pulse from said pulsed radio navigation signal by said radio navigation receiver
    c) generating a range estimate from said correlation.

10. The method of claim 9 wherein the pulsed navigation signal provides sufficient quiet time between pulses to allow multipath signals to substantially dissipate.

11. The method of claim 9 wherein the radio navigation receiver samples the transmitted signal at a sample rate, and slides the sample rate relative to the received pulsed radio navigation signal to reduce aliasing effects.

12. The method of claim 9 wherein the radio navigation receiver samples the transmitted pulsed radio navigation signal at a sample rate, and wherein the method further includes timing for issuing a pulse time mark, the pulse time mark providing a reference between the pulsed radio navigation signal and the sample rate, such that the correlation remains synchronous with the rapid pulsing pattern.

13. A method mitigating multipath in a radio navigation receiver, the method comprising the steps of:
    a) receiving a pulsed CDMA radio navigation signal;
    b) correlating the pulsed CDMA radio navigation signal with internally generated pseudorandom code sequence in order to produce correlation values;
    c) generating range estimates from a subset of correlation values of the produced correlation values, the subset of correlation values being associated with leading edges of the pulsed CDMA radio navigation signal,
such that the range estimates are generated from correlation values that are least multipath-affected.

14. The method of claim 13, the method further comprising the steps of:
    sampling to form pulsed CDMA radio navigation signal samples; and
    separating the pulsed CDMA radio navigation signal samples such that samples associated with the leading edges of each CDMA radio navigation signal pulse are processed independently from samples that are sampled later within each CDMA radio navigation signal pulse.

15. The method of claim 13, wherein the pulsed CDMA radio navigation signal comprises sufficient quiet time between pulses so as to enable multipath signals to dissipate prior to the beginning of subsequent pulses.

16. The method of claim 13, further including generating a range measurement comprising the steps of:
   obtaining sample points on a correlation response function of the subset of correlation values, the correlation response function including of an increasing ramp followed by a plateau region followed by a decreasing ramp; and
   determining the edge of the plateau region using the sample points.

17. The method of claim 16, wherein the obtained sample points are fitted so that at least one sample point is on the increasing ramp of the correlation response function and at least one sample point is on the plateau region of the correlation response function.

18. The method of claim 13, the method further comprising the steps of:

a) sampling the pulsed CDMA radio navigation signal at a sample rate prior to correlation;
   b) storing the produced correlation values into independent accumulation bins;
   c) determining accumulation bins associated with the leading edges of the pulsed CDMA radio navigation signal.

19. The method of claim 18, the method further comprising the step of sliding the sample rate of the relative to the pulsed CDMA radio navigation signal, such that aliasing affects are reduced.

20. The method of claim 18, the method further comprising the step of issuing a pulse time mark, the pulse time mark providing a reference between the pulsed CDMA radio navigation signal and the sample rate, such that the produced correlation values remain synchronous with the pulsed CDMA radio navigation signal.

\* \* \* \* \*